(12) United States Patent
Miyauchi et al.

(10) Patent No.: US 9,033,770 B2
(45) Date of Patent: May 19, 2015

(54) COMBINED PROCESSING TOOL

(75) Inventors: Shinya Miyauchi, Uozu (JP); Yoshio Masuda, Uozu (JP); Katsuyuki Kawasumi, Uozu (JP)

(73) Assignee: Sugino Machine Limited, Uozu-shi, Toyama (JP)

( * ) Notice: Subject to any disclaimer, the term of this patent is extended or adjusted under 35 U.S.C. 154(b) by 702 days.

(21) Appl. No.: 13/325,759

(22) Filed: Dec. 14, 2011

(65) Prior Publication Data

US 2012/0149288 A1 Jun. 14, 2012

(30) Foreign Application Priority Data

Dec. 14, 2010 (JP) ................................. 2010/278109

(51) Int. Cl.
| | | |
|---|---|---|
| B24B 39/02 | (2006.01) | |
| B23B 41/00 | (2006.01) | |
| B23B 41/12 | (2006.01) | |
| B23B 29/034 | (2006.01) | |

(52) U.S. Cl.
CPC ........... *B23B 29/03417* (2013.01); *B23B 41/12* (2013.01); *B23B 2270/027* (2013.01); *B23B 2270/26* (2013.01); *B24B 39/023* (2013.01)

(58) Field of Classification Search
CPC ................ B23B 2270/26; B23B 41/12; B23B 2270/027; B23B 29/03417; B24B 39/023; B24B 39/02; B24B 39/045
USPC ....................................................... 451/461
See application file for complete search history.

(56) References Cited

U.S. PATENT DOCUMENTS

| | | | | |
|---|---|---|---|---|
| 3,517,533 | A | * | 6/1970 | Kožnar .............................. 72/76 |
| 4,380,851 | A | * | 4/1983 | Dickinson .................... 29/90.01 |
| 6,560,835 | B2 | * | 5/2003 | Porter et al. .................. 29/90.01 |
| 2002/0152597 | A1 | * | 10/2002 | Porter et al. .................. 29/90.01 |

FOREIGN PATENT DOCUMENTS

| | | | | |
|---|---|---|---|---|
| EP | 1512492 A1 | * | 3/2005 | .............. B24B 39/02 |
| JP | 2007-301645 A | | 11/2007 | |
| JP | 2007301645 A | * | 11/2007 | |
| JP | 2010-094750 A | | 4/2010 | |
| JP | 2010094750 A | * | 4/2010 | |

OTHER PUBLICATIONS

JP 2007-301645 English Machine Translation.*
JP 2010-094750 English Machine Translation.*

* cited by examiner

*Primary Examiner* — Joseph J Hail
*Assistant Examiner* — Marc Carlson
(74) *Attorney, Agent, or Firm* — Merchant & Gould P.C.

(57) ABSTRACT

A combined processing tool includes a shank of a cylindrical shape, a mandrel fixed to the shank, a frame rotation-universally fitted outside the mandrel, a burnishing unit for performing a burnishing to an inner peripheral surface of a workpiece by rolling members, a dimple forming unit for performing a dimple forming to the surface of the workpiece by surface compression members so as to universally appear from and disappear in the frame, a body fixed to a top portion of the shank, and a skiving unit for performing a cutting, wherein, on an outer peripheral region of the mandrel, an outer peripheral surface 31c and a concave and convex shape area which consists of concave parts and convex parts alternately arranged along an outer peripheral direction of the mandrel are formed, and wherein the concave and convex parts are alternately engaged in the compression members with being rotated.

4 Claims, 6 Drawing Sheets

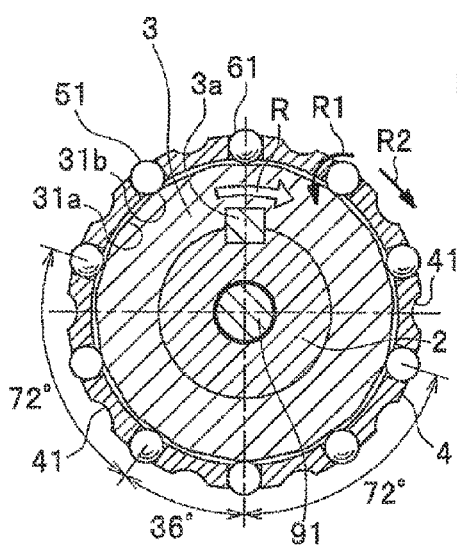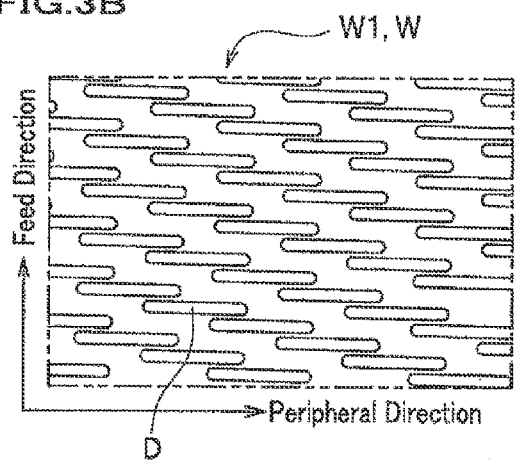
FIG.3A
FIG.3B

COMBINED PROCESSING TOOL

This application is claims benefit of Serial No. 2010-278109, filed 14 Dec. 2010 in Japan and which application is incorporated herein by reference. To the extent appropriate, a claim of priority is made to each of the above disclosed applications.

BACKGROUND OF THE INVENTION

1. Field of the Invention

The present invention relates to a combined processing tool, and particularly, to the tool comprising a skiving unit, a burnishing unit, and a dimple forming unit.

2. Description of the Related Art

Conventionally, a combined processing tool is known for simultaneously performing a cutting and a roller burnishing to an inner surface of a hole of a cut object such as a cylinder. This combined processing tool is provided with a skiving unit for performing the cutting on one side of the tool and provided with a burnishing unit for performing the roller burnishing on the other side; when the tool is moved forward to an inner surface of a workpiece, a cutting edge of the skiving unit cuts the inner surface of the object, and when the tool is moved rearward, rollers of the burnishing unit perform the burnishing. Furthermore, with respect to this kind of combined processing tool, there also exists a type of the tool that performs both of a cutting and a burnishing in moving forward (for example, see Japanese Patent Laid-Open Publication No. 2010-94750).

Furthermore, there exists a combined processing tool for forming dimples on a slide face of a cylinder and the like and forming a burnishing. This kind of combined processing tool performs the burnishing to the slide face, thereby improves a durability and a wear resistance, and forms dimples of an oil pool for improving a lubricity (for example, see Japanese Patent Laid-Open Publication No. 2007-301645).

According to this kind of combined processing tool, when balls and rollers placed in a same retainer contact a convex part of a polygonal mandrel rotating inside the retainer, it is possible to smoothly finish an inner surface of a workpiece through a surface compression action of the rollers with the dimples formed by the balls being thrown outward from the retainer pushed onto the processed surface of the workpiece However, according to these combined processing tools, when the cutting, the burnishing, and the dimple forming are performed to the inner surface of a workpiece of a cylinder and the like, at least two processes are required; therefore, two kinds of tools used for the processes, respectively, are required, and there exists a problem that not only a manpower and but also cost runs.

Consequently, there is a need for a combined processing tool comprising a skiving unit, a burnishing unit, and a dimple forming unit.

SUMMARY OF THE INVENTION

A combined processing tool according to a first aspect of the present invention comprises a shank formed into a cylindrical shape, a mandrel fixed to the shank, a frame rotation-universally fitted outside the mandrel, a burnishing unit configured to perform a burnishing to an inner peripheral surface of a workpiece by rolling members held in the frame, a dimple forming unit configured to perform a dimple forming to the inner peripheral surface of the workpiece by surface compression members which are held in the frame so as to universally appear from and disappear in the frame, a body fixed to a top portion of the shank, and a skiving unit arranged at the body and configured to perform a cutting, wherein, on an outer peripheral region of the mandrel, a concave and convex shape area of an approximately polygonal shape, which is essentially consisting of concave parts and convex parts alternately arranged in an outer peripheral direction of the mandrel, and an outer peripheral surface of the mandrel are formed, and wherein the concave parts and the convex parts are alternately engaged in the surface compression members with being rotated.

In addition, in the invention, although members for performing the burnishing are called the "rolling members," respectively, other members for performing the dimple forming are called the "surface compression members," respectively, and for convenience, both are classified, it is not a purpose to strictly classify movements by terminologies of a "rolling" and a "surface compression."

According to the combined processing tool of the first aspect of the invention, the tool comprises the skiving unit at the top portion thereof and the burnishing unit and the dimple forming unit at a rear of the skiving unit, and thereby, the tool can perform a skiving, the burnishing, and the dimple forming within one stroke (in moving forward or in moving forward and rearward) by a feed movement of the tool. Therefore, the combined processing tool according to the first aspect of the invention makes it possible to obtain a processed finish surface of the workpiece high in durability and excellent in sliding property while reducing a processing manpower of the workpiece and improving a productivity thereof.

A combined processing tool according to a second aspect of the invention is the tool according to the first aspect of the invention, and the rolling members and the surface compression members are alternately arranged in a peripheral direction of the frame so as to be engaged in the concave and convex shape area, wherein when each of the concave parts of the concave and convex shape area contacts the surface compression members, each of the concave parts is a contracted diameter part which makes the surface compression members to be in a non-contact state with the workpiece, and when each of the convex parts of the concave and convex shape area contacts the surface compression members, each of the convex parts is an expanded diameter part which makes the surface compression members to be in a contact state with the workpiece, and wherein the rolling members are arranged so that the outer peripheral portions of both ends of the rolling members abut with the outer peripheral surface of the mandrel across the concave and convex shape area with respect to axial directions of the mandrel.

According to the combined processing tool of the second aspect of the invention, the rolling members and the surface compression members are alternately arranged in the peripheral direction of the frame so as to be engaged in the concave and convex shape area, the outer peripheral portions of both ends of the rolling members abut with the outer peripheral surface of the mandrel across the concave and convex shape area with respect to the axial directions of the mandrel; thereby, when the mandrel is rotated, the rolling members roll with abutting with the convex parts of the concave and convex shape area and the outer peripheral surface of the mandrel and can perform the burnishing to the inner peripheral surface of the workpiece, and whereas, the surface compression members appear and disappear in a radial direction of the mandrel with alternately abutting with the concave parts and convex parts of the concave and convex shape area and can perform the dimple forming to the inner peripheral surface of the workpiece.

Thus, the combined processing tool according to the second aspect of the invention arrays the rolling members and the surface compression members with a good balance appropriately; thereby, it is possible to perform the burnishing with forming dimples (serving to use as an oil pool and improve a sliding property) having a suitable shape on the inner peripheral surface of the workpiece; therefore, it is possible to obtain a finish processing surface higher in durability and excellent in sliding property.

A combined processing tool according to a third aspect of the invention is the tool of the second aspect of the invention, and on the outer peripheral surface of the frame, each of longitudinal grooves configured to make a coolant flow out from an end side to top side of the frame is formed between respective ones of the rolling members and the surface compression members along the axial directions.

According to the combined processing tool of the third aspect of the invention, each of the longitudinal grooves is formed between respective ones of the rolling members and the surface compression members along the axial directions, and thereby, it is possible to arrange the longitudinal grooves, the rolling members, and the surface compression members on the frame with a good balance.

Therefore, because the coolant can be supplied as far as the skiving unit at the top portion of the combined processing tool, it is possible to smoothly and efficiently achieve the burnishing and the dimple forming and to improve the productivity of the workpiece.

A combined processing tool according to a fourth aspect of the invention is the tool of any one of the first to third aspects of the invention, and the mandrel comprises a taper on the outer peripheral region of the mandrel and configured to contact the rolling members and the surface compression members with the taper.

According to the combined processing tool of the fourth aspect of the invention, the tool comprises the taper on the outer peripheral region of the mandrel and configured to contact the rolling members and the surface compression members with the taper, and thereby, it is possible to appropriately adjust appearing and disappearing states of the rolling members and the surface compression members by adjusting a positional relationship between the mandrel and the frame in the axial directions thereof; therefore, it is possible to perform a suitable burnishing and skiving matching with a use condition of the workpiece.

Because the combined processing tool of the present invention can smoothly and efficiently achieve the skiving, the burnishing, and the dimple forming within one stroke, it is possible to obtain a finish processing surface high in durability and excellent in sliding property while reducing the processing manpower of the workpiece and improving the productivity thereof.

BRIEF DESCRIPTION OF THE DRAWINGS

FIG. 1A shows a state of a skiving diameter expanded; and FIG. 1B shows a state of the skiving diameter contracted.

FIGS. 3A and 3B are drawings showing respective states of dimples formed by the combined processing tool according to an example of the embodiment: FIG. 3A is a section drawing along a line A-A of FIG. 2 and showing an array of rollers and balls; FIG. 3B is a schematic drawing showing the state of dimples formed on an inner surface of a workpiece by the combined processing tool.

FIG. 5A shows a state of the ball forming one of the dimples; and FIG. 5B shows a state of the ball forming no dimple.

FIG. 6A is a section drawing showing an array of rollers and balls; and FIG. 6B is a schematic drawing showing a state of dimples formed on an inner surface of a workpiece.

FIGS. 7A and 7B show the second modification example; FIGS. 7C and 7D show the third modification example; each of FIGS. 7A and 7C are section drawings showing respective arrays of rollers and balls; and FIGS. 7B and 7D are schematic drawings showing respective states of dimples formed on inner surfaces of workpieces.

BEST MODE(S) FOR CARRYING OUT THE INVENTION

A combined processing tool 1 according to an embodiment of the present invention will be described in detail with reference to drawings. In addition, for a convenience of descriptions, a side where a shank 2 is arranged will be called a rear side (rear portion), and the opposite side will be called a front side (top side, front portion).

The combined processing tool 1 according to the embodiment can be used by being attached to a processing machine (not shown) such as a machining center comprising a feed device in the axial directions with being rotated or by being attached to an exclusive skiving machine.

In addition, the exclusive skiving machine, although not shown, can supply a coolant to the combined processing tool 1 for the purpose of discharging chips, and lubricating, cooling, and cleaning a workpiece W (see FIG. 1A); sufficiently and high-accurately process an inner surface of the workpiece W with making the coolant communicating from one end of the workpiece W to the other end thereof through the inner surface thereof; and strikingly improve a wear resistance and surface roughness of the workpiece W.

Therefore, according to the exclusive skiving machine, it is possible to suitably process the inner surface of the workpiece W such as a cylinder member which is used under a severe condition like a hydraulic cylinder tube and air cylinder tube of a construction machine and a forklift, various shock absorbers, and the like, and where a load resistance and a durability are required.

Figure 1A:
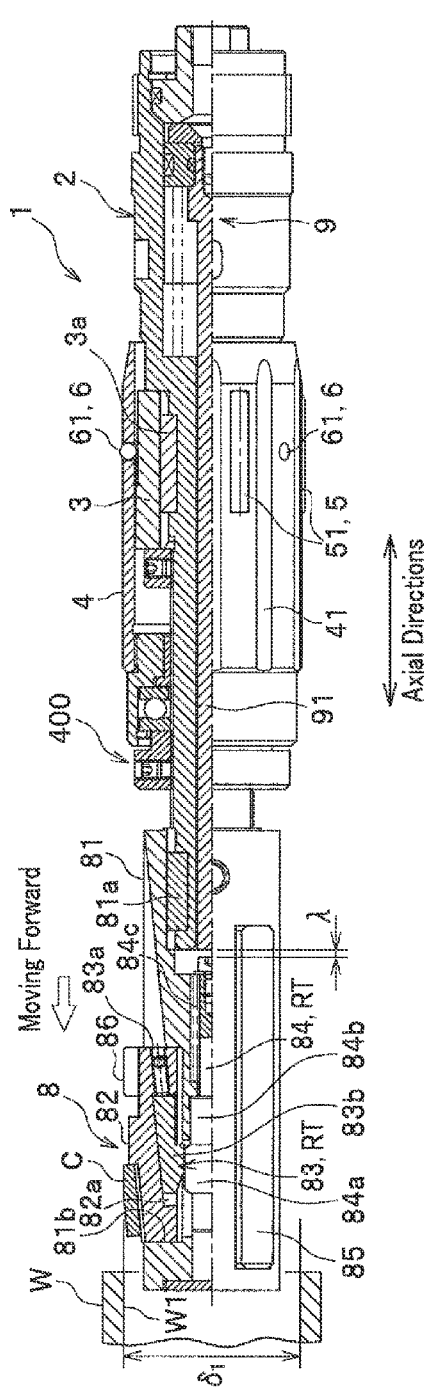
FIGS. 1A and 1B are respective half section drawings illustrating a configuration of a combined processing tool according to an embodiment of the present invention.

The combined processing tool 1 according to the embodiment comprises, as shown in FIG. 1A, a shank 2 attached to a processing machine not shown, a mandrel 3 fixed to the shank 2, a frame 4 rotation-universally fitted outside the mandrel 3, a burnishing unit 5 essentially consisting of rollers 51 of the rolling members held in the frame 4, a dimple forming unit 6 essentially consisting of balls 61 of the surface compression members held so as to universally appear from and disappear in the frame 4, a body 81 fixed to a top of the shank 2, a skiving unit 8 arranged at the body 81 and configured to perform a cutting, a retract mechanism RT configured to expand a skiving diameter (δ1 in FIG. 1A) of a cutting diameter in skiving and to contract the diameter δ1 to a diameter (δ2 in FIG. 1B), and a reciprocating movement mechanism 9 configured to drive the mechanism RT.

Here, each axis of the combined processing tool 1, the shank 2, the mandrel 3, the frame 4, the skiving unit 8, the retract mechanism RT, and the reciprocating movement mechanism 9 is coaxial; accordingly, axial directions thereof shown in FIGS. 1A, 1B, 2, 4A, and 4B are same.

As shown in FIG. 1A, the combined processing tool 1 performs the skiving to the workpiece W supplied from the top side by the skiving unit 8 arranged at the top. Then, subsequently after the skiving, it is possible to perform the burnishing by the burnishing unit 5 arranged in series more rearward than the skiving unit 8 and to perform the dimple forming which simultaneously serves a utilization as an oil pool at the dimple forming unit 6 and improves a sliding property.

Although in the embodiment, examples of a so-called two-way system are described where the combined processing tool 1 performs the skiving to the workpiece W in moving forward to it, and performs the burnishing and the dimple forming in moving rearward from it, it is also possible to adopt a so-called one-way system where the tool 1 performs the skiving, the burnishing, and the dimple forming to the workpiece W in moving forward to it.

Figure 2:
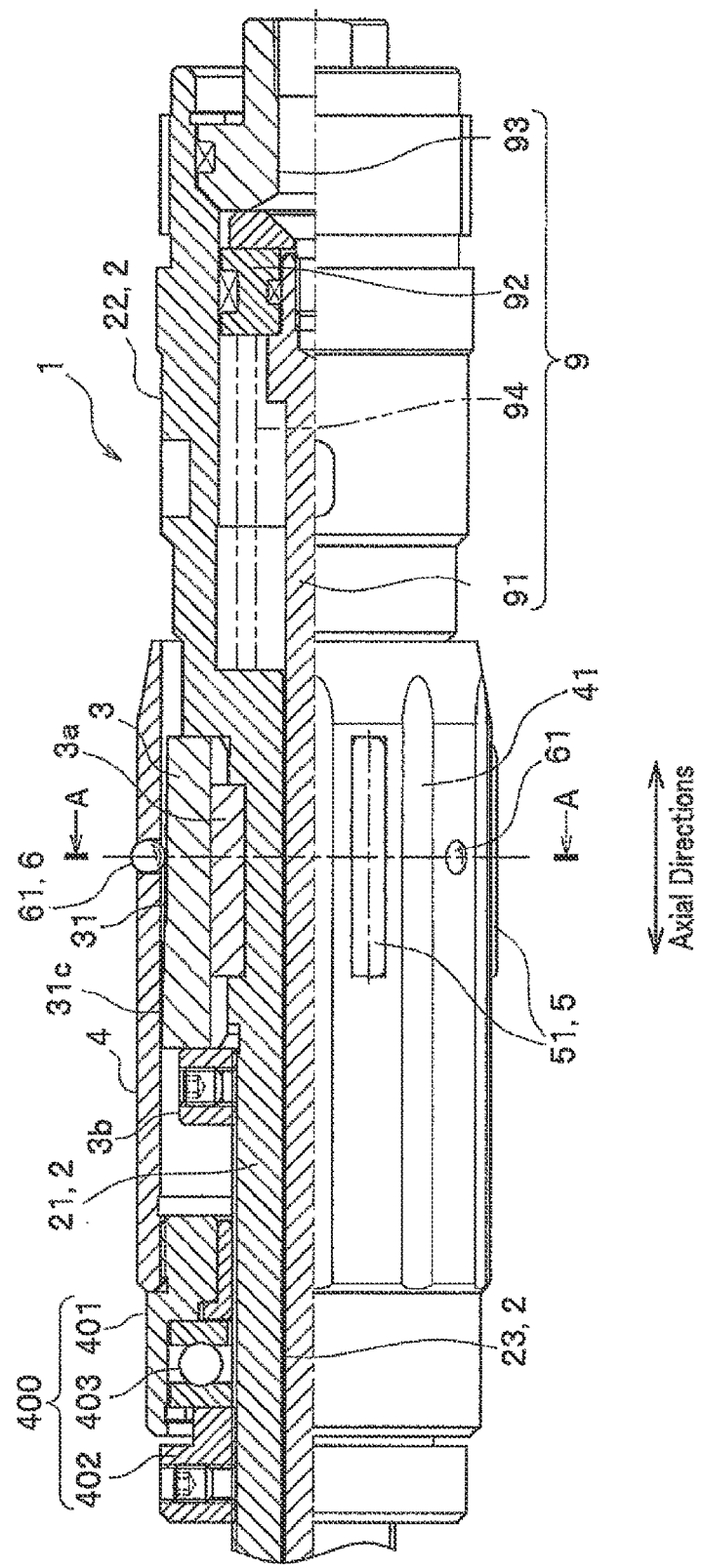
FIG. 2 is a main-portion half section drawing illustrating a rear portion of the combined processing tool according to the embodiment.

The shank 2 is an approximately cylindrical shape and, as shown in FIG. 2, comprises a barrel portion 21 whose outer diameter is contracted and which configures a middle portion to top side of the shank 2; a machine attachment portion 22 configuring the rear side of the shank 2 and expanded in diameter; and an inner peripheral portion 23 essentially consisting of a penetration hole penetrating from the top to rear of the shank 2. To the top of the shank 2 is fixed the body 82 by a key 81a (see FIG. 1A), and to an outer peripheral portion of the barrel portion 21 is fixed the mandrel 3 by a key 3a and a fixation ring 3b. The shank 2 is configured to rotate by attaching the machine attachment portion 22 to a machine tool (not shown).

To the inner peripheral portion 23 of the shank 2 is inserted a retract bar 91 so as to be universally moved forward and rearward, and a piston 92 is sliding-universally attached; thus the reciprocating movement mechanism 9 described later is configured.

The mandrel 3 is an approximately cylindrical shape, and on an outer peripheral region 31R thereof, a concave and convex shape area 31 and an outer peripheral surface 31c of a cylindrical shape member are formed (see FIGS. 3A, 4A, 4B, 5A, and 5B), wherein the area 31 essentially consisting of concave parts 31a and convex parts 31b, wherein the outer peripheral region 31R whose rear side is contracted in diameter comprises a taper TP (see FIGS. 4A and 4B), and wherein the rollers 51 and the balls 61 are configured to contact and engage the taper TP.

Figure 4A:
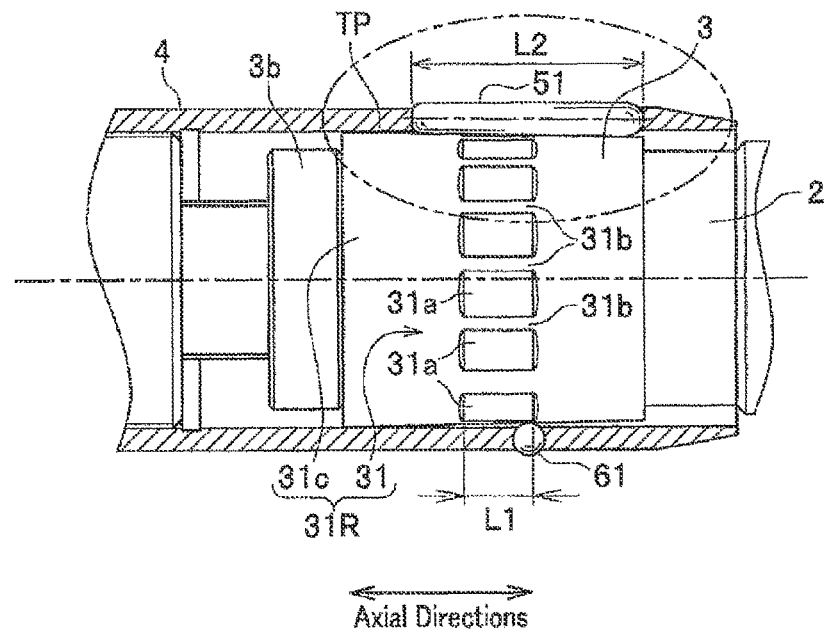
FIG. 4A is a main-portion section drawing illustrating a relationship between a concave and convex shape area, and respective ones of the rollers and the balls.
Figure 4B:
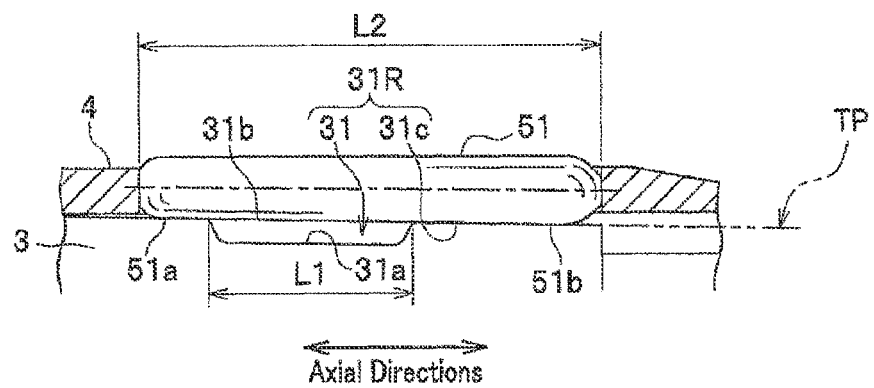
FIG. 4B is a main-portion enlarged drawing around the roller in FIG. 4A.

In addition, because the embodiment adopts the two-way system, the taper TP is contracted in diameter on the rear side as shown in FIGS. 4A and 4B; however, in adopting the one-way system a taper expanded in diameter is formed on the rear side contrary to the embodiment.

With respect to the concave and convex shape area 31, as shown in FIG. 3A, the concave parts 31a and the convex parts 31b are alternately arranged, and for example, it is possible to configure the area 31 with an approximately polygonal shape by equally dividing a circumference of the area 31 into fifteen in a section view thereof. Specifically, the concave and convex shape area 31 alternately forms respective fifteen pieces of the concave parts 31a and the convex parts 31b along a peripheral direction of the mandrel so as to cut off portions corresponding to the concave parts 31a from the outer peripheral surface 31c in a definite range L1 (see FIG. 4A) in the axial directions of the mandrel 3 so as to once go around along the peripheral direction thereof; thus, the parts 31b are formed into an approximately polygonal shape of a pentadecagon formed of a smooth curved surface.

Here, each of the convex parts 31b of the concave and convex shape area 31 is an expanded diameter part (see FIG. 5A), and when each of the convex parts 31b contacts the surface compression member 61, the expanded diameter part makes the surface compression member 61 to be in a contact state with the workpiece W; each of the concave parts 31a is a contracted diameter part (see FIG. 5B), and when each of the concave parts 31a contacts the surface compression member 61, the contracted diameter part makes the surface compression member 61 to be in a non-contact state with the workpiece W, Then the concave and convex shape area 31 is formed, as shown in FIGS. 4A and 4B, in the mandrel 3 so as to be engaged in the ball 61 and the roller 51 held in the frame 4.

Figure 5A:
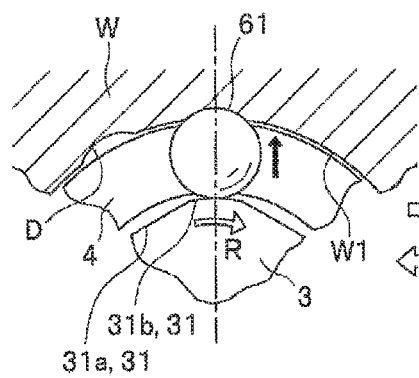
FIGS. 5A and 5B are respective main-portion section drawings around one of the balls and showing a manner of a dimple forming by the combined processing tool according to the embodiment.
Figure 5B:
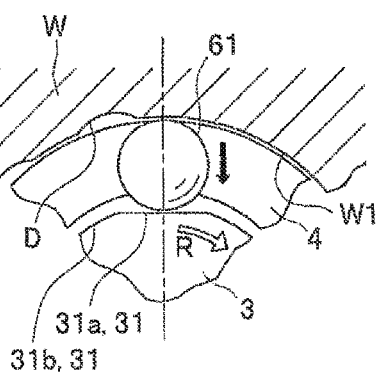

Specifically, the ball 61 is engaged so as to alternately encounter and abut with respective ones of the concave parts 31a and convex parts 31b of the concave and convex shape area 31 when the mandrel 3 is rotated (FIGS. 5A and 5B). On the other hand, the roller 51 is engaged in the concave and convex shape area 31 so that outer peripheral portions 51a, 51b of both ends of the roller 51a but with the outer peripheral surface 31c of the mandrel 3 across the concave and convex shape area 31 (see FIG. 4B).

The frame 4 is, as shown in FIG. 1A, a cylindrical member rotation-universally fitted outside the mandrel 3, the roller 51 is rotation-universally held in the frame 4 (see FIG. 4B), the ball 61 is held so as to universally appear from and disappear in the frame 4, and a longitudinal groove 41 (see FIG. 3A) for making a coolant, which is mainly supplied in the skiving, flow out from the rear side to front side of the frame 4 is formed between the roller 51 and the ball 61 along the axial directions.

The rollers 51 and the balls 61 are arranged, as the example in FIG. 3A, by respective five pieces thereof in a peripheral direction of the frame 4 at total ten places equally distributed.

In addition, as shown in FIG. 1A, a positional adjustment mechanism 400 for moving the frame 4 and adjusting a position thereof is provided at the frame 4.

The positional adjustment mechanism 400 comprises, as shown in FIG. 2, a stem 401 integrally connected to the frame 4 and an adjust nut 402 screwed in the outer peripheral portion of the shank 2, and the nut 402 is configured to make the stem 401 move forward and rearward through a thrust bearing 403 in the axial directions.

According to the configurations thus described, by rotating the adjust nut 402 and making the frame connected to the stem 401 move forward and rearward in the axial directions, it is configured that the rollers 51 are rotation-universally held in the frame 4, and the rollers 51 and the balls 61 appear from and disappear in the frame 4 along the taper TP (see FIG. 4B) formed in the mandrel 3 and that a burnishing diameter by the roller 51 and a depth of a dimple D (see FIGS. 5A and 5B) by the ball 61 can be adjusted.

The burnishing unit 5 is, as shown in FIG. 1A, a unit for performing the burnishing (surface compression) by the rollers 51 revolving along an inner peripheral surface W1 of the workpiece W with rolling so as to press the surface W1.

As shown in FIGS. 4A and 4B, the roller 51 has a shape having a roller is length L2 longer than an axial-direction length L1 of the concave and convex shape area 31 and is arranged so that the outer peripheral portions 51a, 51b of both ends of the roller 51 abut with the outer peripheral surface 31c of the mandrel 3 across the concave and convex shape area 31 with respect to the axial directions of the mandrel 3 (see FIG. 4B).

In addition, by using the roller 51 configured to make a line contact with the mandrel 3 in the burnishing unit 5, even when burrs formed so as to protrude around the dimple D (see FIG. 5A) formed by the dimple forming unit 6 are generated, it is possible to obtain a good finish surface so as to crush the protruding burrs.

According to the configurations thus described, the rollers 51 pass above the parts 31a without abutting with the concave parts 31a of the concave and convex shape area 31 even when the mandrel 3 is rotated, and with always abutting with at least the outer peripheral surface 31c of the mandrel 3 and being supported by the surface 31c and the convex parts 31b; therefore, it is possible to perform the burnishing without vibrating in the radial direction of the mandrel 3 and with stably rolling.

Specifically, as shown in FIG. 3A, when the mandrel 3 is rotated clockwise (see R in FIG. 3A), the rollers 51 rotate counterclockwise (see R1 in FIG. 3A); therefore, the rollers 51 revolute clockwise (see R2 in FIG. 3A) with being pressed along the inner peripheral surface W1 (see FIG. 1B) of the workpiece W and perform the burnishing. At this time, according to the revolution movement of the rollers 51, the frame 4 similarly rotates clockwise (see R2 in FIG. 3A).

The dimple forming unit 6 is, as shown in FIGS. 5A and 5B, a unit for forming the dimple D (also see FIG. 3B) on the inner peripheral surface W1 of the workpiece W by the ball 61 appearing from and disappearing in the frame 4 by the mandrel 3 rotating (see R in FIGS. 5A and 5B).

Specifically, when the mandrel 3 rotates clockwise and the ball 61 encounters and abuts with the convex part 31b of the concave and convex shape area 31, the ball 61 is pushed outside in the radial direction of the mandrel 3 with rotating; therefore, the dimple D is formed on the inner peripheral surface W1 (see FIG. 5A) of the workpiece W. On the other hand, when the mandrel 3 is further rotated and the ball 61 encounters the concave part 31a of the area 31, the ball 61 enters inside in the radial direction; therefore, no dimple D is formed (see FIG. 5B).

At this time, because the frame 4 rotates clockwise, the ball 61 revolves clockwise (see R2 in FIG. 3A) with forming the dimple D; therefore, in a rotation direction (peripheral direction) of the mandrel 3, because the ball 61 revolves with being pushed outside in the radial direction of the mandrel 3 every time when the convex parts 31b abuts with the ball 61, the dimples D elongated in the peripheral direction of the inner peripheral surface W1 of the workpiece W (see FIGS. 1A and 1B) are formed thereon (see FIG. 3B).

Then at the same time, the mandrel 3 is fed in a feed direction; therefore, when movements of the mandrel 3 in the feed direction and the peripheral direction are combined, the dimples D as in FIG. 3B are formed.

FIG. 3B shows a state of the dimples D formed on the inner peripheral surface W1 of the workpiece W in a case of: the rollers 51 and the balls 61 being arranged by respective five pieces thereof at the ten places equally distributed; and the polygonal shape of the mandrel 3 being a pentadecagon (see FIG. 3A). As shown in FIG. 3B, according to the embodiment, it is seen that the dimples D are uniformly formed by a proper rate on the inner peripheral surface W1 of the workpiece W. Then, as shown in FIG. 3A, because each section area of the longitudinal grooves 41 for making the coolant, which is mainly supplied in the skiving, flow from the rear side to front side of the frame 4, is sufficiently ensured, it is possible to obtain a sliding property suitable for the inner peripheral surface W1 of the workpiece W.

Thus, according to the combined processing tool 1, the rollers 51 and the balls 61 are appropriately arrayed in the frame 4 so that each of the longitudinal grooves 41 is formed in the axial directions between respective ones of the rollers 51 and the balls 61 neighboring with each other; thereby, it is possible to perform the burnishing with forming the dimples D of a suitable shape on the inner peripheral surface W1 of the workpiece W and to smoothly discharge chips by the cutting through the grooves 41. Therefore, while efficiently achieving the skiving, the burnishing, and the dimple forming and improving a productivity of the workpiece W, it is possible to obtain a processed finish surface of the workpiece W high in durability and excellent in sliding property.

Subsequently, a first modification example of dimple forming of the embodiment where a rotation number and a feed speed are equal to those of the example of the embodiment (FIGS. 3A and 3B) will be described with reference to FIGS. 7A and 7B.

Figure 6A:
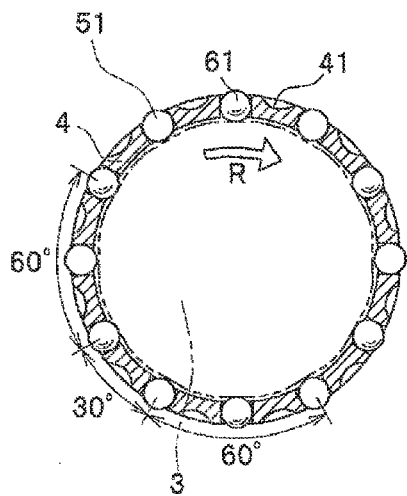
FIGS. 6A and 6B are drawings showing respective states of dimples formed by the combined processing tool according to a first modification example of the embodiment.
Figure 6B:
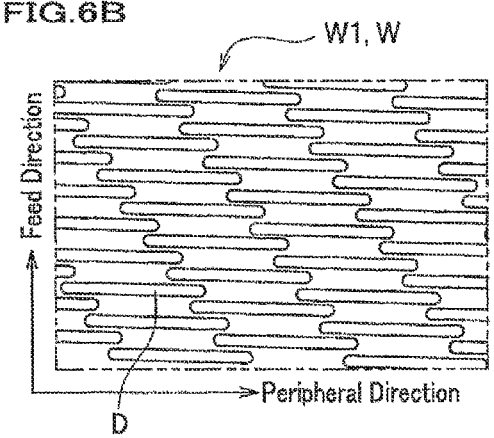

FIG. 6B shows a state of the dimples D formed on the inner peripheral surface W1 of the workpiece W in a case of: the rollers 51 and the balls 61 being arranged by respective six pieces thereof at twelve places equally distributed; and a polygonal shape of the mandrel 3 being a dodecagon (see FIG. 6A).

As shown in FIG. 6A, according to this condition, if a first modification example is compared to the example of the embodiment (FIGS. 3A and 3B), the each number of the rollers 51 and the balls 61 is increased by one, and a number of corners in the polygonal shape of the mandrel 3 is decreased from fifteen to twelve.

Accordingly, with respect to a distribution state of the dimples D in the first modification example, although the dimples D are formed to be slightly denser than the example (see FIG. 3B) in each interval of the dimples D, they are uniformly formed (see FIG. 6B). Then, as shown in FIG. 6A, because each section area of the longitudinal grooves 41 (see FIG. 2) for making the coolant, which is mainly supplied in the skiving, flow from the rear side to front side of the frame 4, is also ensured, it is possible, similarly to the example (see FIG. 3A and 3B), to obtain a sliding property suitable for the inner peripheral surface W1 of the workpiece W.

Figure 7A:
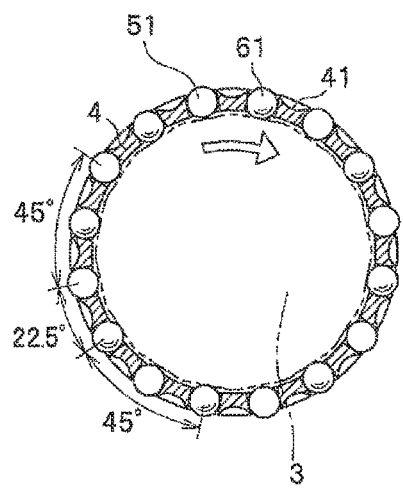
FIGS. 7A to 7D are drawings showing respective states of dimples formed by the combined processing tool according to second and third modification examples of the embodiment.
Figure 7B:
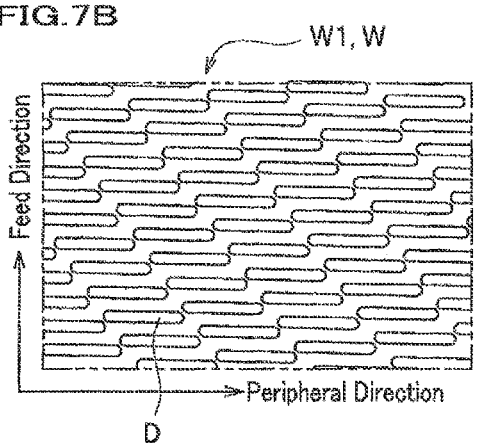

FIG. 7B shows a state of the dimples D formed on the inner peripheral surface W1 of the workpiece W in a case of: the rollers 51 and the balls 61 being arranged by respective eight pieces thereof at sixteen places equally distributed; and a polygonal shape of the mandrel 3 being a hexadecagon (see FIG. 7A).

As shown in FIG. 7A, according to this condition, if a second modification example of the embodiment is compared to the example thereof (FIG. 3A), each number of the rollers 51 and the balls 61 is increased by three, and a number of corners in the polygonal shape of the mandrel 3 is increased from fifteen to sixteen.

Accordingly, with respect to a distribution state of the dimples D shown in FIG. 7B, each interval of the dimples D is formed to be narrower than that of the example (see FIG. 3B) and the dimples D are formed to be denser than those of the example (see FIG. 3B); therefore, the condition is a suitable condition when a high effect as an oil pool is expected.

Figure 7C:
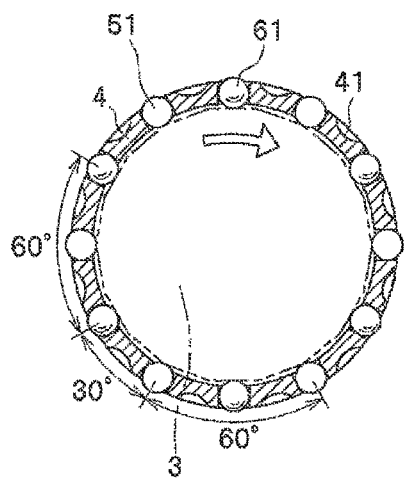
Figure 7D:
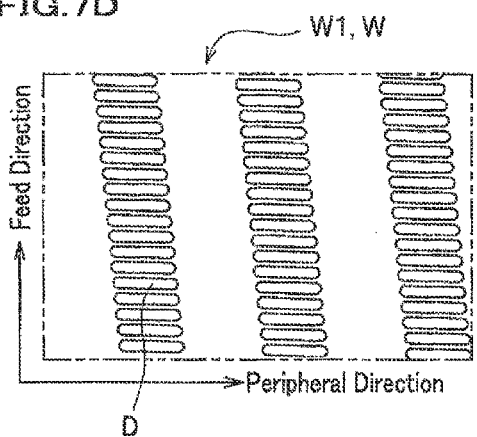

FIG. 7D shows a state of the dimples D formed on the inner peripheral surface W1 of the workpiece W in a case of: the rollers 51 and the balls 61 being arranged by respective six pieces thereof at twelve places equally distributed; and the polygonal shape of the mandrel 3 being an octadecagon (see FIG. 7C).

As shown in FIG. 7C, according to this condition, if a third modification example of the embodiment is compared to the example thereof (FIG. 3A), each number of the rollers 51 and the balls 61 is increased by one, and a number of corners in the polygonal shape of the mandrel 3 is increased from fifteen to eighteen.

Figure 1B:
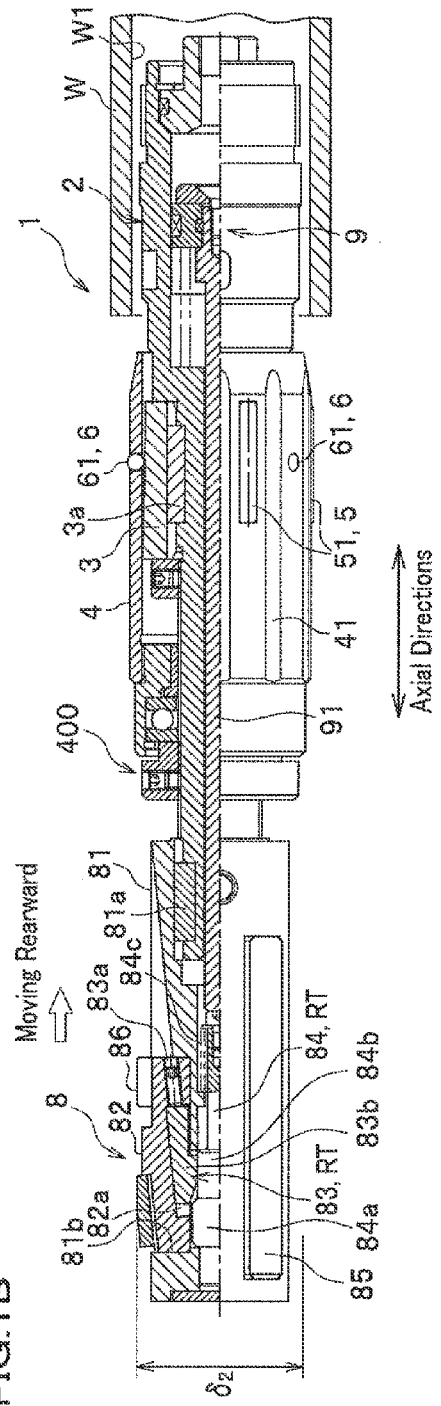

The skiving unit 8 comprises, as shown in FIGS. 1A and 1B, a cartridge 82 configured to fix a tip C of a cutting edge arranged at an outer peripheral portion of the body 81 formed into a cylindrical shape, an adjustment block 83 arranged at a bottom portion of the cartridge 82, and a retract pin 84 inserted inside the body 81 as universally movable forward and rearward.

The cartridge 82 is rectangular and is attached so as to be energized in a center direction of the body 81 by an energizing device (not shown) fitted in a depressed portion 81b formed in the outer peripheral portion of the body 81. According to the configuration thus described, because the cartridge is energized by the energizing device (not shown) in a direction where the skiving diameter δ1 is made to be small, the adjustment block 83 arranged at the bottom portion of the cartridge 82 acts to press the retract pin 84 and tightly contact it.

At the bottom portion of the cartridge 82 is formed a groove 82a having an inclination in the axial directions, and the cartridge 82 is fixed with an adjustment screw 83a universally in positional adjustment in the axial directions. According to the configuration thus described, by moving the adjustment block 83 in the axial directions along the groove 82a, it is possible to adjust the skiving diameter δ1.

Specifically, when the adjustment block 83 is moved forward by the adjustment screw 83a, the skiving unit 8 is in an expanded state (see δ1 in FIG. 1A); when the adjustment block 83 is moved rearward through the adjustment screw 83a, the skiving unit 8 is in a contracted state (see δ2 in FIG. 1B). Thus, by moving the adjustment block 83 along the groove 82a in the axial directions, it is possible to minutely adjust the cutting diameter δ1; therefore, it is possible to flexibly cope according to a required quality and the like of the workpiece W.

In addition, a guide 86 is attached to the cartridge 82. The guide 86 is a part attached so that a cutter (tip C) does not drop in a hole when there exist a port hole and the like in a skiving face, and the guide 86 is attached so that the guide 86 and the tip C are the same in height.

In the adjustment block 83 is formed a protruded portion 83b that can be engaged in any one of a large diameter part 84a and a small diameter part 84b toward a direction (center direction of the body 81) of the retract pin 84.

The retract pin 84 is attached in an inner peripheral portion of the body 81 by providing a clearance λ (FIG. 1A) between the pin 84 and the retract bar 91 in a state of being energized in a rearward direction by an energizing device 84c and is formed into a stepped shape comprising the large diameter part 84a and the small diameter part 84b engaged in the protruded portion 83b of the adjustment block 83.

According to the configurations thus described, the retract mechanism RT is configured so as to expand the skiving diameter (δ1 in FIG. 1A) and to contract the diameter δ1 (δ2 in FIG. 1B). That is, in a state of the retract pin 84 being rearward by the energizing device 84c, as shown in FIG. 1B, the large diameter part 84a and the protruded portion 83b of the adjustment block 83 are engaged, and the skiving diameter δ1 is in the expanded state.

On the other hand, in a state of the retract pin 84 being forward (FIG. 1A) through the retract bar 91 by the reciprocating movement mechanism 9 described later, the engagement between the large diameter part 84a of the retract pin 84 and the protruded portion 83b of the adjustment block 83 is released, and the small diameter part 84b of the pin 84 and the portion 83b of the block 83 are engaged; therefore, as shown in FIG. 1B, the skiving diameter δ1 (FIG. 1A) is contracted into 62.

In addition, to several places of an outer peripheral surface of the body 81 are attached guide pads 85 protrudingly formed from the outer peripheral surface of the body 81 like a pedestal as shown in FIG. 1A. These guide pads 85 play a role of suppressing a vibration and keeping a stable processing accuracy by stably holding the workpiece W.

The reciprocating movement mechanism 9 comprises, as shown in FIG. 2, the retract bar 91 inserted in the shank 2 so as to be coaxial with the retract pin 84 inserted in the body 81 (see FIGS. 1A and 1B), a piston 92 fixed to the bar 91, a fluid supply passage 93 for moving the piston 92 in a forward direction, and a spring 94 of the energizing device for energizing the piston 92 in a rearward direction.

According to the configuration thus described, the reciprocating movement mechanism 9 can move the retract bar 91 forward and rearward by respectively supplying and stopping air (pressure fluid as a motive energy source) to the fluid supply passage 93 from a air supply source not shown.

Specifically, in a state of air being not supplied to the fluid supply passage 93, as shown in FIG. 1A, the retract bar 91 is returned to a retract position by the spring 94. Therefore, the retract pin 84 configuring the retract mechanism RT is also returned to a retract position thereof by the energizing device 84c (see FIG. 1B).

On the other hand, when air is supplied to the fluid supply passage 93, the piston 92 is moved forward by fluid pressure of the air with resisting an energizing force of the spring 94; therefore, it is possible to move the retract bar 91 forward.

Thus, according to the reciprocating movement mechanism 9, the fluid supply passage 93 is provided, thereby the piston 92 is actuated by air, and the retract pin 84 is moved through the retract bar 91; thereby, it is possible to ensure a stable movement of the retract mechanism RT by a simple configuration.

Subsequently, movements of the combined processing tool 1 according to the embodiment thus configured will be described. The combined processing tool 1 performs the skiving by the skiving unit 8 to the workpiece W supplied from the front side, as shown in FIG. 1A, wherein the unit 8 is provided at the top portion of the tool 1 in a state of the cutting diameter δ1 expanded by the retract mechanism RT.

Then, subsequently after the skiving, when the workpiece W is moved rearward, the cutting diameter δ1 is contracted (δ2) by the retract mechanism RT as shown in FIG. 1B, it is possible to perform the burnishing by the burnishing unit 5 arranged in a series more rear than the skiving unit 8 and to simultaneously perform the dimple forming by the dimple forming unit 6.

Therefore, by providing the retract mechanism RT, it is possible in the burnishing and the dimple forming to surely prevent an intervention between the workpiece W and the tip C of a cutting edge (see FIG. 1B).

Thus, because the combined processing tool 1 can perform the skiving, the burnishing, and the dimple forming within one stroke by the feed movement of the tool 1 or the workpiece W, it is possible to obtain the processed finish surface of the workpiece W high in durability and excellent in sliding property while reducing the processing manpower of the workpiece W and improving the productivity thereof.

Thus, the embodiment of the present invention has been described; however, the invention is not limited to the embodiment and can be modified and changed within the spirit and scope of the invention.

For example, in the embodiment, although it is assumed that the skiving is performed in moving the combined processing tool 1 forward, and the burnishing and the dimple forming are performed in moving the tool 1 rearward, the embodiment is not limited thereto; taking the productivity of the workpiece W into consideration, the skiving, the burnishing, and the dimple forming may be simultaneously performed in moving the tool 1 forward, and the tool 1 may be moved rearward quickly.

Furthermore, in the embodiment, although the rollers 51 and the balls 61 are configured to be engaged in the concave and convex shape area 31, it is also possible to align the rollers 51 and the balls 61 along the axial directions, to form the area 31 at positions engaged in the balls 61, and thus not to engage the area 31 in the rollers 51.

Furthermore, in the embodiment, although the rolling members of the burnishing unit 5 are configured with the rollers 51, and the surface compression members of the dimple forming unit 6 are configured with the balls 61, the embodiment is not limited thereto; the rolling members may be configured with a ball (sphere), and the surface compression members may be configured with a roller.

What is claimed is:

1. A combined processing tool comprising:
   a shank formed to be a cylindrical shape to be attached to a machine tool;
   a mandrel fixed to the shank, the mandrel comprising an outer peripheral region including an outer peripheral surface, and a concave and convex shape area of an approximately polygonal shape essentially consisting of concave parts and convex parts alternately arranged in a circular direction of the mandrel;
   a frame equipped outside an outer peripheral surface of the mandrel so as to be capable of rotating relatively to the mandrel;
   a burnishing unit configured to perform burnishing to an inner peripheral surface of a workpiece with rollers held kept in the frame;
   a dimple forming unit configured to perform dimple forming to the inner peripheral surface of the workpiece with balls kept in the frame so as to freely appear from and disappear in the frame;
   a body fixed to a top portion of the shank; and
   a skiving unit arranged at the body and configured to perform cutting,
   wherein the rollers and the balls are alternately arranged in a circular direction of the frame so as to be engaged with the concave and convex shape area, and the concave parts and the convex parts of the concave and convex shape area alternately engage the balls according to a rotation of the mandrel,
   wherein when each of the concave parts of the concave and convex shape area contacts with an associated one of the balls, each of the concave parts makes the associated one in a non-contact state with the workpiece, and when each of the convex parts of the concave and convex shape area contacts with an associated one of the balls, each of the convex parts makes the associated one in a contact state with the workpiece, and
   wherein the rollers are disposed so that
      an outer peripheral surface of one end portion of each of the rollers keeps contacting with the outer peripheral surface of the mandrel, the outer peripheral surface of the mandrel being outside one end of the concave and convex shape area in an axial direction of the mandrel, and
      an outer peripheral surface of the other end portion of each of the rollers keeps contacting with the outer peripheral surface of the mandrel, the outer peripheral surface of the mandrel being outside the other end of the concave and convex shape area in the axial direction of the mandrel,
      thereby each of the rollers rolls according to the rotation of the mandrel while a position of each of the rollers in a radial direction of the mandrel is kept constant without being engaged with any of the concave parts, to perform burnishing.

2. The combined processing tool according to claim 1, wherein, on an outer peripheral surface of the frame, each of longitudinal grooves configured to make a coolant flow out from an end side to top side of the frame is formed between respective ones of the rollers and the balls along the axial directions.

3. The combined processing tool according to claim 1, wherein the mandrel further comprises a taper on the outer peripheral region of the mandrel and configured to contact with the rollers and the balls with the taper.

4. The combined processing tool according to claim 2, wherein the mandrel further comprises a taper on the outer peripheral region of the mandrel and configured to contact with the rollers and the balls with the taper.

* * * * *